US012501180B2

(12) United States Patent
Sharabi et al.

(10) Patent No.: US 12,501,180 B2
(45) Date of Patent: Dec. 16, 2025

(54) RGB-NIR PROCESSING AND CALIBRATION

(71) Applicant: SAMSUNG ELECTRONICS CO., LTD., Suwon-si (KR)

(72) Inventors: Yarden Sharabi, Tel-Aviv (IL); Doron Sabo, Tel-Aviv (IL); Roee Sfaradi, Tel-Aviv (IL); Shachar Praisler, Tel-Aviv (IL); Stas Dubinchik, Tel-Aviv (IL); Michael Dinerstein, Tel-Aviv (IL); Sapir Kontente, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 421 days.

(21) Appl. No.: 17/804,096

(22) Filed: May 25, 2022

(65) Prior Publication Data

US 2023/0388667 A1    Nov. 30, 2023

(51) Int. Cl.
*H04N 25/131* (2023.01)
*H04N 7/01* (2006.01)
*H04N 23/84* (2023.01)

(52) U.S. Cl.
CPC ......... *H04N 25/131* (2023.01); *H04N 7/0145* (2013.01); *H04N 23/843* (2023.01); *H04N 2209/046* (2013.01); *H04N 2209/047* (2013.01)

(58) Field of Classification Search
CPC .. H04N 25/131; H04N 23/843; H04N 7/0145; H04N 2209/046; H04N 2209/047

(Continued)

(56) References Cited

U.S. PATENT DOCUMENTS 5,629,734 A    5/1997  Hamilton et al.
8,938,121 B2   1/2015  Lee et al.
(Continued)

FOREIGN PATENT DOCUMENTS

CN    108965654         12/2018
FR    3101504 A1 *     4/2021    ............. G02B 5/201
(Continued)

OTHER PUBLICATIONS

Huixuan Tang, et al., "High Resolution Photography with an RGB-Infrared Camera," 2015 IEEE International Conference on Computational Photography (ICCP), Apr. 24-25, 2015, pp. 1-10.
(Continued)

*Primary Examiner* — Edemio Navas, Jr.
*Assistant Examiner* — Jimmy S Lee
(74) *Attorney, Agent, or Firm* — Morgan, Lewis & Bockius LLP

(57) ABSTRACT

A method for processing images acquired by a multi-spectral RGB-NIR (red/green/blue/near infra-red) sensor includes receiving a RGB-NIR digital image from a multi-spectral RGB-NIR sensor, interpolating an NIR contribution to each R, G and B pixel value, wherein an NIR image is obtained, subtracting the NIR contribution from each R, G and B pixel value in the RGB-NIR digital image wherein a decontaminated RGB-NIR image is obtained, constructing a red, green and blue (RGB) Bayer image from the decontaminated RGB-NIR image, and processing the Bayer image wherein a full color image is obtained. The RGB-NIR digital image includes red (R) pixels, green (G) pixels, blue (B) pixels, and NIR pixels, and every other row in the RGB-NIR digital image includes NIR pixels that alternate with green pixels, and every other row in the RGB-NIR digital image includes green pixels that alternate with red and blue pixels.

5 Claims, 21 Drawing Sheets

(58) Field of Classification Search
USPC .......................................................... 348/164
See application file for complete search history.

(56) References Cited

U.S. PATENT DOCUMENTS

| | | | |
|---|---|---|---|
| 10,728,446 | B2 | 7/2020 | Zhou et al. |
| 2008/0018750 | A1* | 1/2008 | Oh ..................... H04N 25/134 |
| | | | 348/E9.051 |
| 2011/0234842 | A1* | 9/2011 | Ishiga ................. H04N 23/843 |
| | | | 348/E9.037 |
| 2014/0307098 | A1 | 10/2014 | Kang et al. |
| 2015/0062347 | A1 | 3/2015 | Jin |
| 2015/0287766 | A1* | 10/2015 | Kim ................. H01L 27/14612 |
| | | | 257/40 |
| 2017/0064275 | A1 | 3/2017 | Chen et al. |
| 2017/0374299 | A1 | 12/2017 | Lu et al. |
| 2018/0013962 | A1 | 1/2018 | Chang |
| 2018/0359432 | A1* | 12/2018 | Horak ................. H04N 25/133 |
| 2019/0110037 | A1 | 4/2019 | Lukac |
| 2021/0044763 | A1 | 2/2021 | Sun et al. |
| 2021/0044785 | A1 | 2/2021 | Hsiao et al. |
| 2021/0195117 | A1 | 6/2021 | An et al. |
| 2021/0218917 | A1* | 7/2021 | Ke .................... H01L 27/14649 |

FOREIGN PATENT DOCUMENTS

KR        10-1923957        11/2018
WO    WO-2014081106 A1 *  5/2014    .......... G01B 11/2513

OTHER PUBLICATIONS

Hayata Teranaka, et al., Single-Sensor RGB and NIR Image Acquisition: Toward Optimal Performance by Taking Account of CFA Pattern, Demosaicking, and Color Correction (2016), Society for Imaging Science and Technology pp. DPMI-256.1-DPMI-256-6.

Navinprashath R R et al., "Learning based demosaicing and color correction for RGB-IR patterned image sensors (2019)," International Symposium on Electronic Imaging Autonomous Vehicles and Machines Conference, pp. 045-1-046-6.

Zahra Sadeghipoor, et al., "Demultiplexing Visible and Near-Infrared Information in Single-Sensor Multispectral Imaging," pp. 1-6.

Chul Hee Park, et al., "Color restoration for infrared cutoff filter removed RGBN multispectral filter array image sensor (2015)," Proceedings of the 10th International Conference on Computer Vision Theory and Applications (VISAPP-2015), pp. 30-37.

Xavier Soria, et al., "Wide-Band Color Imagery Restoration for RGB-NIR Sing Sensor mages (2018)," Sensors, pp. 1-17.

Yan Niu et al., Y. N. e. al., "Low Cost Edge Sensing for High Quality Demosaicking," pp. 1-19.

* cited by examiner

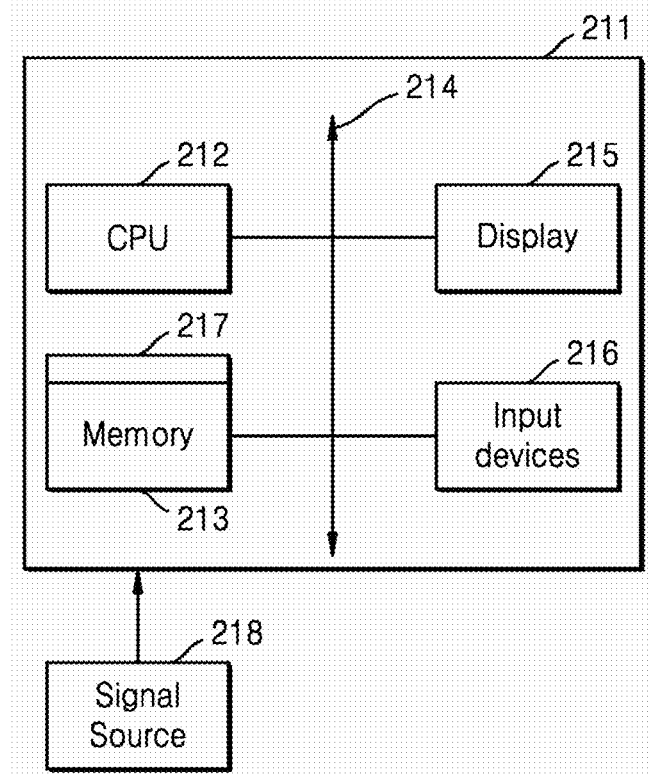

RGB-NIR PROCESSING AND CALIBRATION

TECHNICAL FIELD

Embodiments of the disclosure are directed to image processing. More particularly, Embodiments of the disclosure are directed to the processing of image acquired by multi-spectral RGB-NIR sensors. These sensors allow the visible and near-infrared spectral bands of a given scene to be captured at the same time.

DISCUSSION OF THE RELATED ART

Most current digital cameras have color filter arrays (CFA) based on visible light sensing units (pixels). For example, Bayer CFAs are composed of three types of pixels. Each type has a different spectral response in the visible light range. The three different spectra are associated with red, green and blue colors.

Recently, sensors that can simultaneously capture near IR (NIR) and color (RGB) have gained popularity.

This is relevant for example for in vehicle infotainment as the NIR channel is effective in low light conditions, e.g. within a car, while the RGB information is useful in good illumination conditions. Being able to capture both wavelength domains in the same sensor saves the cost of having two sensors, one for each domain.

RGB-NIR sensors include both near-infrared and visible light pixels, however, the addition of NIR pixels reduces the number of the visible light pixels as compared to commonly used CFAs like the Bayer CFA. This special structure of the RGB-IR CFAs requires adjustments of the image signal processing (ISP) pipeline.

Different structures with different ratios between NIR pixels and visible pixels can be considered for RGB-NIR sensors. Two popular CFAs are the following:

(1) RGB-NIR 2×2: In this type the green component in every other row is replaced with an NIR component. FIG. 1 shows an RGB-NIR 2×2 CFA type, according to an embodiment of the disclosure.

(2) RGB-IR 4×4: In this 4×4 CFA, the green channels are left intact, so that there is no loss of resolution for the green channels. The color (Red/Blue) channels are alternated horizontally, unlike in Bayer CFA. The color channels are replaced with an NIR component in every other row. FIG. 2 shows a RGB-NIR 4×4 CFA type, according to an embodiment of the disclosure.

In addition, as sensors based on silicon have sensitivities that extend into the NIR range, visible light sensors are usually equipped with IR-Cut filters that prevent the NIR spectrum from reaching the pixels. In the RGB-NIR case, such filters are not used as the NIR spectrum is desired as well. In some cases, the NIR spectrum is filtered in the pixel level only for R, G and B pixels; however, this solution is complex and expensive and therefore in most cases no IR-Cut filter is used at all. As a result, R, G and B pixels have sensitivities also in the NIR spectrum, and therefore values recorded from these pixels are considered contaminated. That is, the values of the R, G and B pixels contain an undesired NIR contribution that results in distorted colors at the output image if the NIR contribution is not removed. The process of removing the NIR component from the R, G, B pixels is described hereafter as "decontamination" or "MR-decontamination".

Using a model described by Tang, et al. [1], and ignoring blurring, the contamination effect can be described by:

$$\begin{bmatrix} j_R \\ j_G \\ j_B \\ j_I \end{bmatrix} = \begin{bmatrix} C_{RR} & C_{RG} & C_{RB} & C_{RI} \\ C_{GR} & C_{GG} & C_{GB} & C_{GI} \\ C_{BR} & C_{BG} & C_{BB} & C_{BI} \\ C_{IR} & C_{IG} & C_{IB} & C_{II} \end{bmatrix} \begin{bmatrix} h_R \\ h_G \\ h_B \\ h_I \end{bmatrix}, \quad (1)$$

where $j_K$ is the value for component K (K=R/G/B/I) in perceived image j, $C_{KL}$ is the contamination factor between component K and component L, and $h_K$ are the underlying uncontaminated narrowband values.

Usually it is reasonable to make the following two assumptions:
(1) Assume contamination between R/G/B channels is negligible: $C_{RG}=C_{BG}=\ldots=0$.
(2) Assume contamination from R/G/B channels to NIR channel is negligible: $C_{IR}=C_{IB}=C_{IG}=0$.

Therefore, only contamination from NIR channel to color channels is accounted for and the equations become, ignoring defocused and saturated pixels:

$$j_I = C_{II} * h_I, \quad (2)$$

and $$j_{R/G/B} = C_{RI/GI/BI} * h_I + C_{RR/GG/BB} * h_{R/G/B}, \quad (3)$$

and therefore:

$$\hat{j}_{R/G/B} = C_{RR/GG/BB} * h_{R/G/B} = j_{R/G/B} - j_I * \frac{C_{RI/GI/BI}}{C_{II}}. \quad (4)$$

This formulation describes the contamination effect as an additive contribution of the NIR component $j_I$, where the constant $$\frac{C_{RI/GI/BI}}{C_{II}}$$

can be treated as the contamination factor. This formulation describes the contamination factor as a global factor, that is, constant throughout the whole frame. However, some consider also the variation of this factor across the frame. Usually a radial model is considered to describe the change of the factor across the frame. Some also consider the dependency of the contamination factor to illumination parameters, such as color temperature.

SUMMARY

Embodiments of the disclosure provide a full pipeline for RGB-NIR images that can output an RGB image as well as a full resolution NIR image.

In addition, embodiments provide a calibration process that computes the contamination factor.

According to an embodiment of the disclosure, there is provided a method for processing images acquired by a multi-spectral RGB-NIR (red/green/blue/near infra-red) sensor, comprising: receiving a RGB-NIR digital image from a multi-spectral RGB-NIR sensor, wherein the RGB-NIR digital image includes red (R) pixels, green (G) pixels, blue (B) pixels, and NIR pixels, wherein every other row in the RGB-NIR digital image includes NIR pixels that alternate with green pixels, and every other row in the RGB-NIR digital image includes green pixels that alternate with red and blue pixels; interpolating an NIR contribution to each R, G and B pixel value, wherein an NIR image is obtained; subtracting the NIR contribution from each R, G and B pixel value in the RGB-NIR digital image wherein a decontaminated RGB-NIR image is obtained; constructing a red, green and blue (RGB) Bayer image from the decontaminated RGB-NIR image; and processing the Bayer image wherein a full color image is obtained.

According to a further embodiment of the disclosure, interpolating an NIR contribution to each R, G and B pixel value comprises, for each pixel in the RGB-NIR digital image, wherein each pixel being considered is a center pixel: selecting neighboring NIR pixels for interpolation, wherein if a center pixel is an NIR pixel, a value of that center pixel is output; calculating interpolation weights for the selected neighboring NIR pixels about each R, G, or B center pixel based on photometric distances between each R, G, or B center pixel and nearest neighbor pixels of the same color; and estimating the NIR contribution to each center pixel by a sum of products of interpolation weights times values of the nearest neighbor pixels of the same color.

According to a further embodiment of the disclosure, interpolating an NIR contribution to each R, G and B pixel value comprises: replacing R and B pixels in the RGB-NIR digital image with a G' pixel whose value is a median of values of nearest neighbor G pixels to the R or B pixel being replaced, wherein an NIR-GGG' image; and demosaicing the NIR-GGG' image wherein a 3-channel image is obtained, where the 3-channel image includes a G channel, a G' channel, and an NIR channel.

According to a further embodiment of the disclosure, subtracting the NIR contribution from each R, G and B pixel value in the RGB-NIR digital image comprises: determining the NIR contributions $\alpha_R$, $\alpha_G$, $\alpha_B$ are for each of R, G and B pixel values; detecting undershoot pixels in the RGB-NIR digital image, and replacing a value of each detected undershoot pixel with a value that is a minimum of K nearest neighbor pixels of a same channel as the detected undershoot pixel; and classifying pixels in the RGB-NIR digital image whose values are saturated by calculating a score of features of nearest neighbor pixels to the pixel being classified, wherein the features are relevant to a determination of whether the pixel being classified is saturated, and replacing the value of a pixel determined to be saturated with a convex combination of a fallback value and the pixel's decontamination value based on the calculated score.

According to a further embodiment of the disclosure, determining the NIR contributions $\alpha_R$, $\alpha_G$, $\alpha_B$ are for each of R, G and B pixel values comprises: finding a 3×4 matrix C that minimizes $\Sigma_i |C \cdot p_i^s - p_i^t|$, wherein i is one of R, G, B, or NIR, $p_i^s$ is a 4×1 vector of R, G, B, and NIR samples acquired by the multi-spectral RGB-NIR sensor, $p_i^t$ is a 3×1 vector of desired R, G, B values, C is of form C=M·D, wherein M is a 3×3 matrix, and D is a 3×4 matrix of form D=

$$\begin{bmatrix} 1 & 0 & 0 & -\alpha_R \\ 1 & 0 & 0 & -\alpha_G \\ 1 & 0 & 0 & -\alpha_B \end{bmatrix},$$

wherein $-\alpha_R$, $-\alpha_G$, $-\alpha_B$ are the NIR contributions for each of R, G and B pixel values respectively.

According to a further embodiment of the disclosure, determining the NIR contributions $\alpha_R$, $\alpha_G$, $\alpha_B$ are for each of R, G and B pixel values comprises: acquiring an RGB image when an NIR light source is turned on wherein $R_1$, $G_1$, $B_1$, and $NIR_1$ values are acquired, and an RGB-NIR image when an NIR light source is turned OFF wherein $R_2$, $G_2$, $B_2$, and $NIR_2$ values are acquired; subdividing each of the RGB image and the RGB-NIR image into a plurality of patches; determining the NIR contributions $\alpha_R$, $\alpha_G$, $\alpha_B$ are for each of R, G and B pixel values by solving the following equations for all of the plurality of patches:

$$\frac{R_1 - \alpha_R NIR_1}{G_1 - \alpha_G \cdot NIR_1} = \frac{R_2 - \alpha_R NIR_2}{G_2 - \alpha_G NIR_2},$$

$$\frac{R_1 - \alpha_R NIR_1}{B_1 - \alpha_B NIR_1} = \frac{R_2 - \alpha_R NIR_2}{B_2 - \alpha_B NIR_2}, \text{ and}$$

$$\frac{B_1 - \alpha_B NIR_1}{G_1 - \alpha_G \cdot NIR_1} = \frac{B_2 - \alpha_B NIR_2}{G_2 - \alpha_G NIR_2}.$$

According to a further embodiment of the disclosure, the method comprises calculating a fallback value from a following equation: fallback=fallback$_1 \cdot \omega$+fallback$_2 \cdot (1-\omega)$, wherein fallback$_1$=R·g$_r$+2G·g$_g$+B·g$_b$, wherein R, G, B are color values of nearest neighbors to the pixel being classified, and g$_r$, g$_g$, g$_b$ are corresponding white balance coefficients, wherein fallback$_2$=(R-r$_{conta}$)g$_r$+2(G-g$_{conta}$)g$_g$+(B-b$_{conta}$)g$_b$, wherein g$_r$, g$_g$, g$_b$ are the white balance coefficients of nearest neighbors to the pixel being classified, and r$_{conta}$, g$_{conta}$, b$_{conta}$ are contamination values calculated from an NIR pixel and the NIR contributions for each of R, G and B pixel values, and $\omega$=

$$\begin{cases} 0 & NIR < thresh_{low} \\ \frac{NIR - thresh_{low}}{thresh_{high} - thresh_{low}} & thresh_{low} < NIR < thresh_{high} \\ 1 & NIR < thresh_{high} \end{cases},$$

wherein thresh$_{low}$ is a threshold for a low NIR value and thresh$_{high}$ is a threshold for a high NIR value.

According to a further embodiment of the disclosure, constructing a red, green and blue (RGB) Bayer image from the decontaminated RGB-NIR image comprises: in rows that contain NIR pixels, replacing NIR pixels with estimated R values, and in rows that do not contain NIR pixels, replacing each R pixel with an estimated B value, and replacing each original B value with a value based on the estimated B value; and correcting each green pixel value in a row that includes red pixels according to $$G_c^* = G_c + \left( \frac{(F(\{G_i^B \in \Omega\}, G_c) + F(\{G_i^R \in \Omega\}, G_c) + F(\{G_i^I \in \Omega\}, G_c))}{3} - F(\{G_i^R \in \Omega\}, G_c) \right),$$

and correcting each green pixel value in a row that includes blue pixels according to $$G_c^* = G_c + \left( \frac{(F(\{G_i^B \in \Omega\}, G_c) + F(\{G_i^R \in \Omega\}, G_c) + F(\{G_i^I \in \Omega\}, G_c))}{3} - F(\{G_i^B \in \Omega\}, G_C) \right),$$

wherein $G_c$ is a green pixel value being corrected, $G^*_c$ is a corrected green pixel value, $\Omega$ is a predetermined neighborhood of nearest pixels to $G_c$, $G_i^R \in \Omega$ are green pixels located in red-rows, $G_j^B \in \Omega$ are green pixels located on blue rows, and $G_j^I \in \Omega$ are green pixels located on NIR rows, $$F(\{G_i^x\}, G_c) = \frac{\sum f(G_i^X, Gc)}{\#\{G_i^x \in \Omega\}},$$

where $\#\{G_i^x \in \Omega\}$ is a number of pixels in $G_i^x \in \Omega$ wherein x is B, R or I, and $f(x,y)$ is any continuous function such that:

$$f(x, y) = \begin{cases} y & x \to \infty \\ x & y - T_1 \le x \le y + T_2, \\ y & x \to -\infty \end{cases}$$

wherein $T_1$ and $T_2$ are predefined thresholds.

According to a further embodiment of the disclosure, processing the Bayer image includes one or more of noise reduction, demosaicing, sharpening, color correction, tone mapping or gamma correction.

According to an embodiment of the disclosure, there is provided a method of interpolating an NIR contribution to each R, G and B pixel value, comprising: receiving a RGB-NIR digital image from a multi-spectral RGB-NIR sensor, wherein the RGB-NIR digital image includes red (R) pixels, green (G) pixels, blue (B) pixels, and NIR pixels, wherein every other row in the RGB-NIR digital image includes NIR pixels that alternate with green pixels, and every other row in the RGB-NIR digital image includes green pixels that alternate with red and blue pixels; calculating a horizontal variation $v_{hg}$ from a weighted combination of absolute values of horizontal differences of green pixels in a same row as each other in an n×n neighborhood about each NIR pixel; calculating a vertical variation $v_{vg}$ from a weighted combination of absolute values of vertical differences of green pixels in a same columns each other in the n×n neighborhood about each NIR pixel; calculating a horizontal interpolation $h_{value\_g}$ of neighboring green values in a same row as each NIR pixel; calculating a vertical interpolation $v_{value\_g}$ of neighboring green values in a same column as each NIR pixel; and calculating an interpolated green neighbor value for each NIR pixel from $w_h \cdot h_{value\_g} + w_v \cdot v_{value\_g}$, wherein $$w_h = \frac{1}{1 + e^{k(v_{hg} - v_{vg})}},$$

$w_v = 1 - w_h$, and k is a predefined constant.

According to a further embodiment of the disclosure, the method comprises: calculating a slash-diagonal variation $v_s$ from a weighted combination of absolute values of differences of red pixels, blue pixels or green pixels in a same slash-diagonal column as each other in an m×m neighborhood about each red or blue pixel; calculating a back-slash diagonal variation variation $v_b$ from a weighted combination of absolute values of differences of red pixels, blue pixels or green pixels in a same back-slash-diagonal column as each other in the m×m neighborhood about each red or blue pixel; calculating a slash-diagonal interpolation $s_{value}$ of neighboring red, blue or green values in a same slash-diagonal column as each red or blue pixel; calculating a back-slash interpolation $b_{value}$ of neighboring red, blue or green values in a same back-slash-diagonal column as each red or blue pixel; and calculating an interpolated red or blue neighbor value for each red or blue neighbor pixel from $w_s \cdot s_{value} + w_b \cdot b_{value}$, wherein $$w_c = \frac{1}{1 + e^{k(v_s - v_b)}},$$

$w_b = 1 - w_s$, and k is the predefined constant.

According to a further embodiment of the disclosure, the method comprises: calculating a horizontal variation $V_{hNIR}$ from a weighted combination of absolute values of horizontal differences of NIR pixels in a same row as each other in an n×n neighborhood about each NIR pixel; calculating a vertical variation $v_{vNIR}$ from a weighted combination of absolute values of vertical differences of NIR pixels in a same columns each other in the n×n neighborhood about each NIR pixel; calculating a horizontal interpolation $h_{value\_NIR}$ of neighboring NIR values in a same row as each NIR pixel; calculating a vertical interpolation $v_{value\_NIR}$ of neighboring NIR values in a same column as each NIR pixel; and calculating an interpolated NIR neighbor value for each NIR pixel from $w_h \cdot h_{value\_NIR} + w_v \cdot v_{value\_NIR}$, wherein $$w_h = \frac{1}{1 + e^{k(v_h - v_v)}},$$

$w_v = 1 - w_h$, k is a predefined constant, $v_h = V_{hNIR} + V_{hg}$ and $v_v = v_{vNIR} + V_{vg}$.

According to a further embodiment of the disclosure, the method comprises: subtracting the NIR contribution from each R, G and B pixel value in the RGB-NIR digital image wherein a decontaminated RGB-NIR image is obtained; constructing a red, green and blue (RGB) Bayer image from the decontaminated RGB-NIR image; and processing the Bayer image wherein a full color image is obtained.

According to an embodiment of the disclosure, there is provided a method for processing images acquired by a multi-spectral RGB-NIR (red/green/blue/near infra-red) sensor, comprising: receiving a sequence of RGB-NIR digital images from a multi-spectral RGB-NIR sensor, wherein the digital images alternate between an LED-ON image acquired with an NIR LED turned on and an LED-OFF image acquired with an NIR LED turned off, wherein each RGB-NIR digital image includes red (R) pixels, green (G) pixels, blue (B) pixels, and NIR pixels, wherein every other row in the RGB-NIR digital image includes NIR pixels that alternate with green pixels, and every other row in the RGB-NIR digital image includes green pixels that alternate with red and blue pixels; registering a consecutive pair of an LED-ON digital image and an LED-OFF digital image into a common coordinate system; classifying pixels in the LED-ON digital image and the LED-OFF digital image whose values are saturated, and de-saturating those pixel values determined to be saturated; subtracting the LED-ON digital image from the LED-OFF digital image according to a following equation: Result=$\beta \cdot (\text{Im}_A - \alpha_j \cdot \text{Im}_B)$, wherein a subtracted NIR digital image is obtained, wherein $\text{Im}_B$ is the LED-ON digital image, $\text{Im}_A$ is the LED-OFF digital image, $\alpha_j$ compensates for differences between consecutive frames, for channels j={R, G, B, NIR}, and $\beta$ compensates for a contamination factor obtained by subtracting pixels from consecutive frames.

According to a further embodiment of the disclosure, the method comprises: receiving an RGB-NIR digital image from a multi-spectral RGB-NIR sensor, wherein the RGB-NIR digital image includes red (R) pixels, green (G) pixels, blue (B) pixels, and NIR pixels, wherein every other row in the RGB-NIR digital image includes NIR pixels that alternate with green pixels, and every other row in the RGB-NIR digital image includes green pixels that alternate with red and blue pixels; interpolating an NIR contribution to each R, G and B pixel value, wherein a spatial NIR digital image is obtained; and fusing the spatial NIR digital image with the subtracted NIR digital image, wherein interpolating an NIR contribution to each R, G and B pixel value comprises, for each pixel in the RGB-NIR digital image, wherein each pixel being considered is a center pixel, selecting neighboring NIR pixels for interpolation, wherein if a center pixel is an NIR pixel, a value of that center pixel is output; calculating interpolation weights for the selected neighboring NIR pixels about each R, G, or B center pixel based on photometric distances between each R, G, or B center pixel and nearest neighbor pixels of the same color; and estimating the NIR contribution to each center pixel by a sum of products of interpolation weights times values of the nearest neighbor pixels of the same color.

According to a further embodiment of the disclosure, the method comprises receiving an RGB-NIR digital image from a multi-spectral RGB-NIR sensor, wherein the RGB-NIR digital image includes red (R) pixels, green (G) pixels, blue (B) pixels, and NIR pixels, wherein every other row in the RGB-NIR digital image includes NIR pixels that alternate with green pixels, and every other row in the RGB-NIR digital image includes green pixels that alternate with red and blue pixels; interpolating an NIR contribution to each R, G and B pixel value, wherein a spatial NIR digital image is obtained; and fusing the spatial NIR digital image with the subtracted NIR digital image, wherein interpolating an NIR contribution to each R, G and B pixel value comprises: replacing R and B pixels in the RGB-NIR digital image with a G' pixel whose value is a median of values of nearest neighbor G pixels to the R or B pixel being replaced, wherein an NIR-GGG' image; and demosaicing the NIR-GGG' image wherein a 3-channel image is obtained, where the 3-channel image includes a G channel, a G' channel, and an MR channel.

According to a further embodiment of the disclosure, the method comprises subtracting the NIR contribution from each R, G and B pixel value in the RGB-NIR digital image wherein a decontaminated RGB-NIR image is obtained; constructing a red, green and blue (RGB) Bayer image from the decontaminated RGB-NIR image; and processing the Bayer image wherein a full color image is obtained.

BRIEF DESCRIPTION OF THE DRAWINGS

FIG. 21 is a block diagram of a system for implementing an image processing pipeline to RGB-NIR sensors that will results in two images, visible and NIR, according to an embodiment of the disclosure.

DETAILED DESCRIPTION

Figure 1:
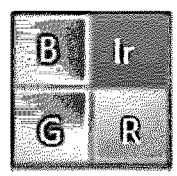
FIG. 1 shows an RGB-NIR 2×2 CFA type, according to an embodiment of the disclosure.

Exemplary embodiments of the disclosure as described herein generally provide systems and methods for processing images acquired by multi-spectral RGB-NIR sensors. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure provide an image processing pipeline that processes a sequence of images acquired from combined RGB-NIR sensors that results in two images, an RGB image and an NIR image, as well as a calibration method. Although in most cases the sequence of images is acquired with an NIR LED that is ON, there are special cases, described below, in which one image is acquired while an NIR LED is ON, and another image is acquired while the NIR LED is off, so that every other image captured with the NIR LED OFF.

Overview

Typical methods process the R/G/B channels in 3 steps:
1. R/G/B/NIR channels interpolation, in which NIR values are interpolated to obtain an estimated value per channel for each pixel, and a full resolution image is obtained for each channel.
2. NIR De-Contamination/color correction, which subtracts a channel-wise programmable portion of NIR interpolated pixels from the R, G, B pixels to reduce cross-talk/contamination effects of the NIR channel.
3. Converting the output to a Bayer pattern by subsampling the clean R, G, B channels according to the Bayer pattern. Bayer reconstruction is performed in two steps: (1) Interpolating (the decontaminated) R, G, B values; and (2) Subsampling according to the Bayer Pattern.

Most existing methods differ in how to perform the interpolations in the first stage and how to model the decontamination.

In many cases, the interpolation of the visible channels (R, G, B) is performed independently of the interpolation of the NIR channel. However, since independent interpolations are used, it is not guaranteed that the edges in the full resolution NIR image will respect the edges of the R, G, B interpolated images. Therefore, by subtracting the crosstalk portion (decontamination), artifacts like overshoots/undershoots/ghosts may appear in vicinity of edges.

It should be noted that for an RGB-NIR 4×4 pattern, the issue of NIR to color misalignment may be less severe over the G channel and more severe on the R/B channels. The reason for that is that the G pixels are placed in the same position both for RGB-NIR4×4 and for the converted Bayer pattern. The decontaminated G pixels at the converted Bayer signal, the result of stage 3 above, result from subtraction of the estimated NIR value from the original G value, where the G is not interpolated/estimated in this case. However, this is not the case for the R and B. Since the R/B channels position differs between the converted Bayer output and the RGB-NIR4×4 input, the subtraction is performed between interpolated R/B values and interpolated NIR values, and therefore the probability of getting misaligned edges is greater.

Due to the above consideration, a method according to an embodiment performs de-contamination on the original R/B values, before interpolating the B/R estimation based on the reconstructed output Bayer. In this case the decontamination for R/B will be a similar method for decontamination of for G in the sense that NIR values are estimated in a way that will match the decontaminated R, G or B pixel.

Figure 3:
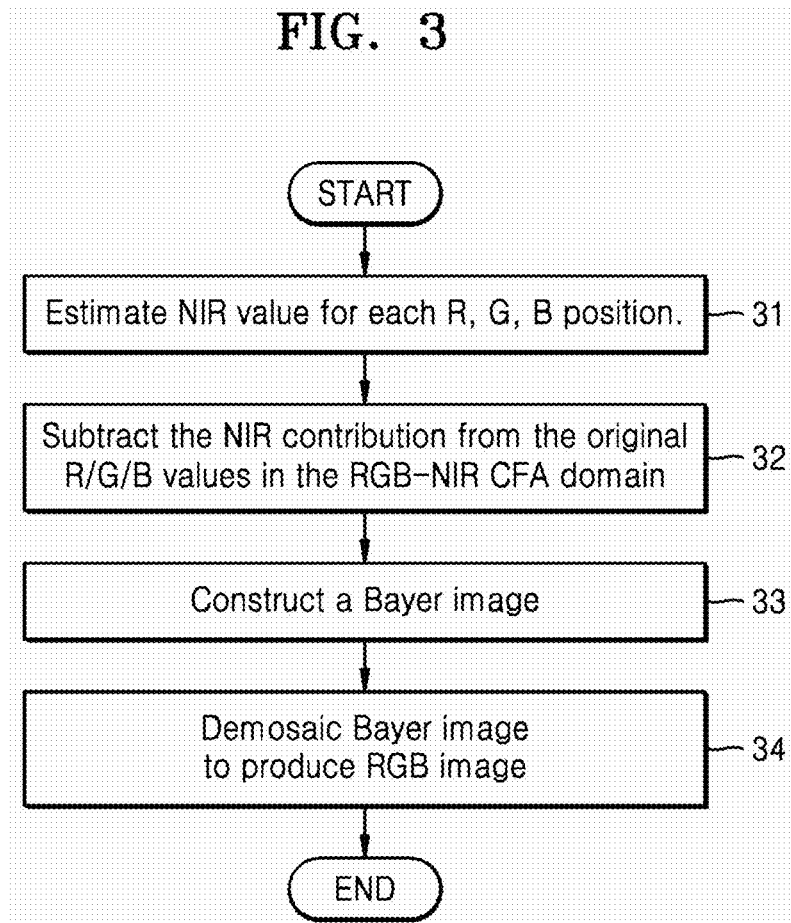
FIG. 3 is a flowchart of a method for processing R/G/B/NIR channels, according to an embodiment.

A method according to an embodiment processes R/G/B/NIR channels as follows, with reference to the flowchart of FIG. 3:
Step 31: NIR Interpolation: estimate NIR value for each R, G, B position. This interpolation should be edge preserving with respect to the R, G, B data to avoid artifacts. Therefore R, G, B guidance is used. This process is described below.
Step 32: NIR De-Contamination: subtract the NIR contribution from the original R/G/B values in the RGB-NIR CFA domain.
Step 33: Reconstruction: Construct a Bayer image, i.e., transform a decontaminated RGB-NIR to a Bayer image: According to the pixel order, CFA pattern size and channel color, R/G/B/NIR pixels are replaced with the corresponding Bayer R/G/B pixel.
Step 34: Produce RGB image using demosaicing. Methods for doing so are known in the art.

According to embodiments, there are several options for performing NIR interpolation, in addition to the bilateral and demosaicing methods present below, collectively referred to a spatial method. One option according to an embodiment is temporal subtraction in which images are alternately captured with LED ON/OFF, where for each pair of images, one image is subtracted from the other. For example, see section IV. Temporal Subtraction, below. This result can be fused with the result of one of the spatial methods.

Another option according to an embodiment for NIR interpolation is to do RGB-NIR designed demosaicing right after the decontamination phase. For example, see section—V. NIR EDGE DIRECTED INTERPOLATION, below.

I. NIR Interpolation

According to embodiments, a full resolution NIR image can serve two different purposes:
Decontamination, as described below. In this case, the resulting NIR image respects the edges/details in the R, G and B images so that artifacts will not occur after decontamination
Produce NIR image for Computer vision tasks and/or Human vision. In this case, the resulting image should preserve the details, however, the exact edge alignment between NIR and RGB image is less critical as compared to the decontamination case.

Since the two targets emphasize different characteristics, different tunings or methods are used for each case.

According to embodiments, different methods for full resolution NIR reproduction are described below.

I.A. Bilateral Interpolation

An approach according to an embodiment uses photometric distances between R, G, B pixels values in a certain local environment as guidance to compute weights for bilateral filtering using neighboring NIR pixels. A method according to an embodiment respects the RGB image edges and is suitable for decontamination purposes.

A method according to an embodiment works as follows.

I.A.1. Stage 1—Selecting Neighboring NIR Pixels

Figure 4:
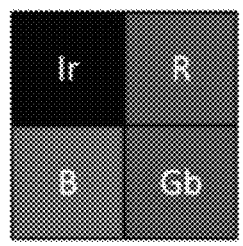
FIG. 4 shows 2×2 CFA cases of interpolation, according to an embodiment of the disclosure.
Figure 5:
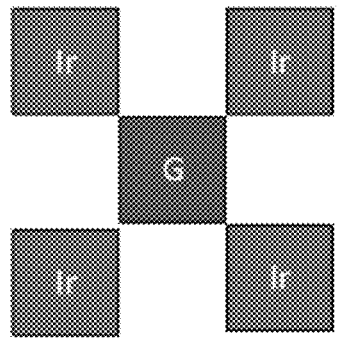
FIG. 5 illustrates an NIR interpolation in an RGB-NIR 2×2 case when the center pixel is G, according to an embodiment of the disclosure.
Figure 6:
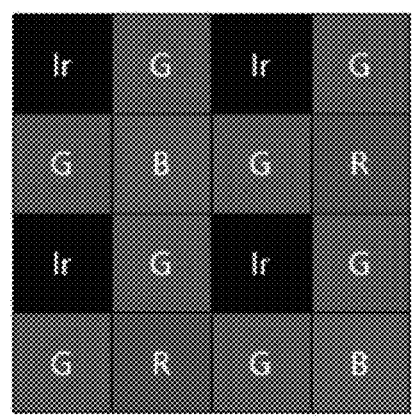
FIG. 6 shows 4×4 CFA cases of interpolation, according to an embodiment of the disclosure.
Figure 7:
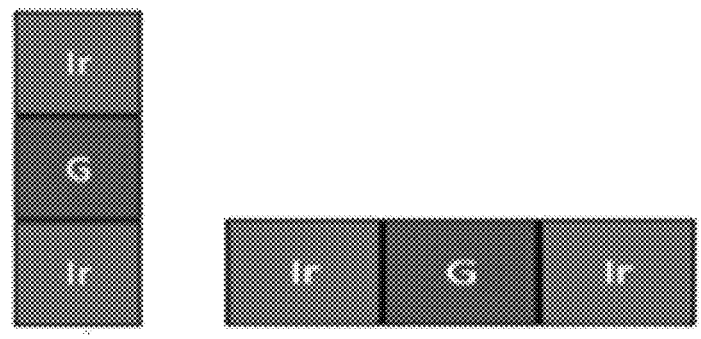
FIG. 7 illustrates an NIR interpolation in an RGB-NIR 4×4 case when the center pixel is G according to an embodiment of the disclosure.

First, in an embodiment, select the NIR pixels that are participating in the interpolation for each case:
I.A.1. a. Case 1: RGB-NIR 2×2 CFA: FIG. 4 shows 2×2 CFA cases for interpolation, according to an embodiment of the disclosure. For RGB-NIR2×2 CFA there are three cases for interpolation:
If the center pixel is NIR: the NIR pixel is outputted as is in the full resolution NIR image.
If the center is Green: a 2D interpolation is performed using the 4 nearest NIR pixels as shown in FIG. 5.
If the center pixel is Red or Blue: the two neighboring NIR pixels shall be used for the interpolation, either vertical neighbors or horizontal neighbors, depending on the pixel order and the color channel.
I.A.1. b. Case 2: NIR interpolation for RGB-NIR 4×4 CFA: FIG. 6 shows 4×4 CFA cases of interpolation, according to an embodiment of the disclosure. For the 4×4 CFA there are the following cases for interpolation:
Center pixel is of NIR type: the NIR pixel is outputted as is in the full resolution NIR image.
Center is Green: the nearest two NIR pixels are used for interpolation. That means that the two vertical NIR neighbors are used in case the G pixel is in a row that contains NIR pixels and the two horizontal NIR pixels are used otherwise. This is demonstrated in FIG. 7.

Figure 8:
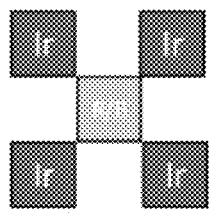
FIG. 8 illustrates an NIR interpolation in an RGB-NIR 4×4 case when the center pixel is R or B, according to an embodiment of the disclosure.

Center is Blue or Red: a 2-d interpolation is performed using diagonal NIR pixels as shown in FIG. 8.

I.A.2. Stage 2—Computing Interpolation Weights

In a method according to an embodiment, the interpolation weights are calculated based on the photometric distance between the center pixel and its nearest neighbors of the same color. For each pixel, calculate the absolute differences between the pixel's value and its closest neighbors' values. Denote by $d_i$ the photometric distance i. Then, use cross channels weighted interpolation for NIR estimation according to those distances.

Figure 9:
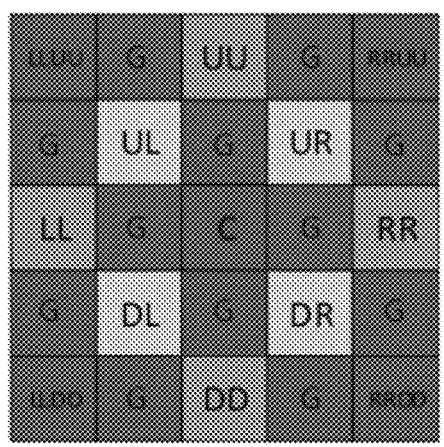
FIG. 9 shows support for an interpolation weights computation, according to an embodiment of the disclosure.

For example, referring to FIG. 9, which shows support for an interpolation weights computation, to estimate the NIR value in the center Red position ("C"), interpolate the nearest NIR pixels as follows:

$$NIR_c = w_0 * NIR_{UL} + w_1 * NIR_{UR} + w_2 * NIR_{DL} + w_3 * NIR_{DR}, \quad (5)$$

The photometric distances $d_i$ corresponding to the weights $w_i$ are:

$$d_0 = |R_{LLUU} - R_C|, \quad (6a)$$

$$d_1 = |R_{RRUU} - R_C|, \quad (6b)$$

$$d_2 = |R_{LLDD} - R_C|, \quad (6c)$$

$$d_3 = |R_{RRUU} - R_C|, \quad (6d)$$

The weights, therefore, can be computed as some function of these photometric distances:

$$w_i = \frac{f(d_i)}{\sum_{j=0}^{3} f(d_j)}, \quad (7)$$

For example, $f(\ )$ may be:

$$f(x) = \frac{1}{x+1}.$$

I.B. Demosaicing Based Method

In a method according to an embodiment, the already commonly used demosaic module is used to perform Up-Sampling of NIR pixels to full resolution. This can be used for full resolution NIR output, as well as for decontamination, producing interpolated NIR values that do not neglect RGB edges. Using demosaicing for the up-scaling task is useful for two more reasons: (1) High quality demosaic modules already include capabilities of high frequencies fusion and edge preservation; and (2) This is a re-use of existing components in the ISP chain for the NIR-Upscale task.

Figure 10:
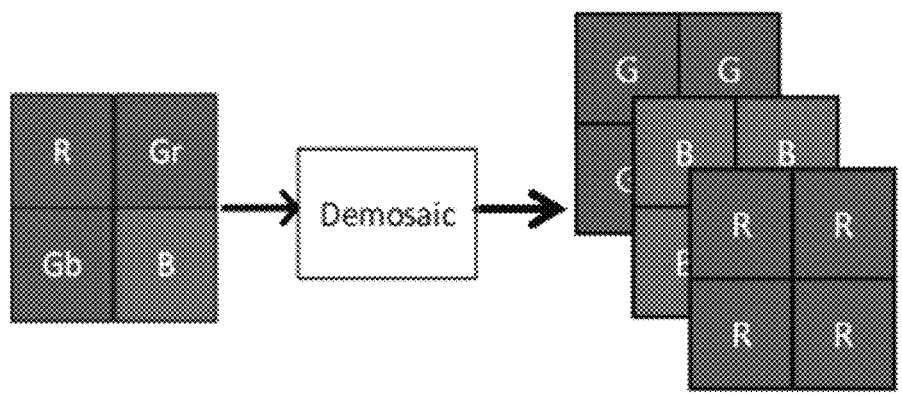
FIG. 10 illustrates a basic operation of a demosaicing algorithm, according to an embodiment of the disclosure.

FIG. 10 illustrates a basic operation of a demosaicing algorithm, according to an embodiment of the disclosure, in which a 2×2 Bayer pattern in shown on the left, and a full color RGB image is shown on the right. Commonly used demosaic modules are optimized for up-sampling Bayer patterns, and perform fusion of information from all channels to improve full resolution outputs of each channel. Demosaicing usually performs inter-channel high-frequency processing, and then high frequencies from the Green channel are used to improve Red and Blue pixels, or NIR pixels.

Figure 2:
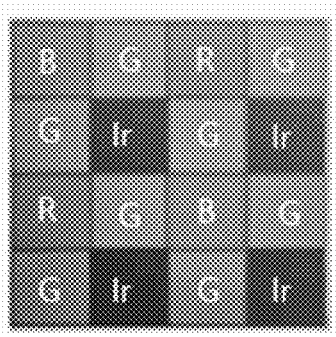
FIG. 2 shows a RGB-NIR 4×4 CFA type, according to an embodiment of the disclosure.
Figure 11:
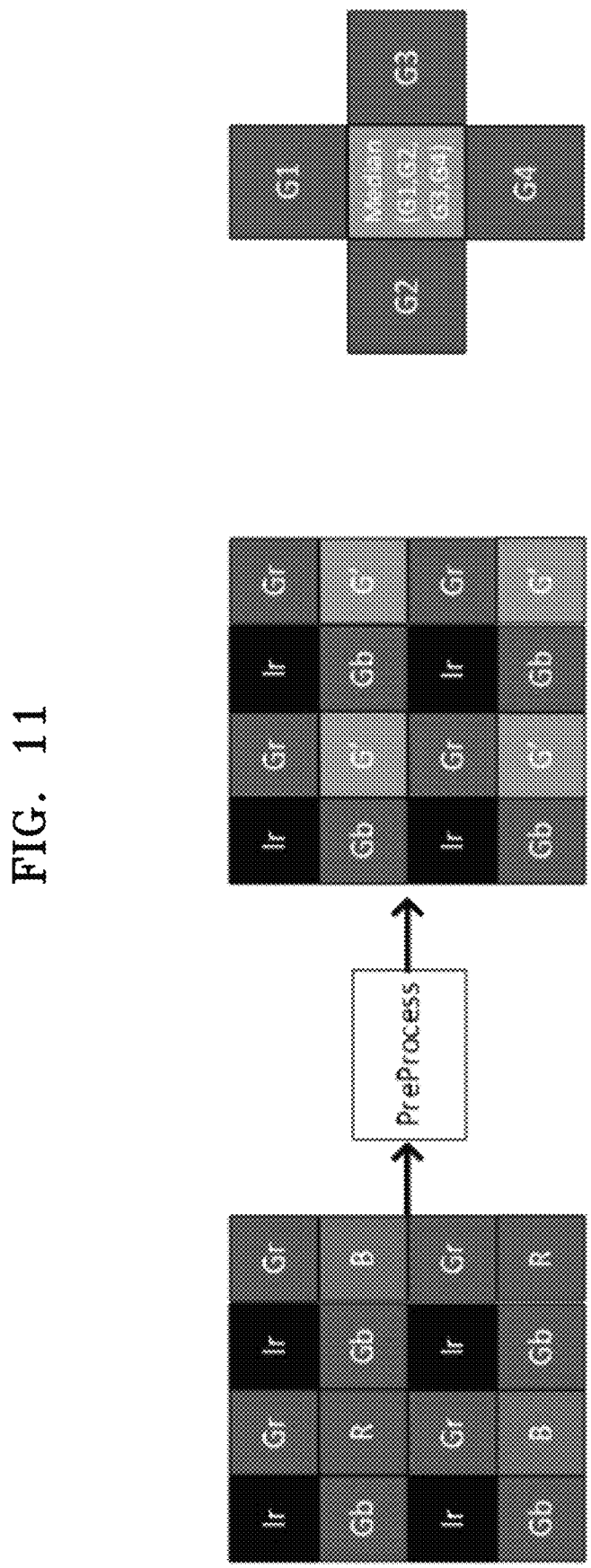
FIG. 11 illustrates the preprocessing of the RGB-NIR pattern to prepare for a demosaic interpolation, according to an embodiment of the disclosure.

Since the input for a demosaicing interpolation according to an embodiment is a RGB-NIR 4×4 pattern as shown in FIG. 2 and the left side of FIG. 11, a simple pre-processing is performed to prepare the RGB-NIR pattern for classic demosaicing. For this step, chroma pixels (red and blue) are replaced with "median of greens" to have just 3 channels. This changes an RGB-NIR 4×4 pattern into an IGGG'2×2 pattern, as shown in the center of FIG. 11. The right hand side of FIG. 11 shows the green pattern extracted from the overall pattern, with the median green pixel in the middle.

Figure 12:
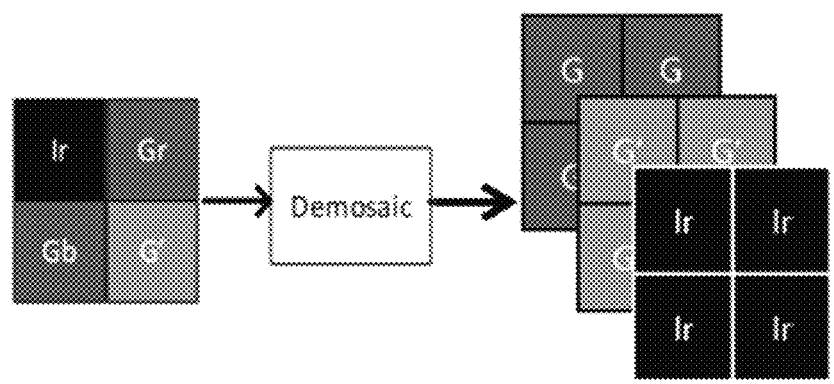
FIG. 12 illustrates demosaicing applied on the pre-processed pattern, according to an embodiment of the disclosure.

Next, a conventional demosaic algorithm that receives input as IGGG'2×2 and outputs full resolution NIR is reused, the other output channels being ignored, as illustrated in FIG. 12.

For the purpose of interpolation, only the full resolution NIR channel output is interesting. In a demosaicing method according to an embodiment, a Bayer stream is not inserted into the demosaiced stream, but rather a stream is prepared that looks like a Bayer stream in the sense that it has the same 2×2 periodicity of the bayer format. However, instead of R,G or B values as in a standard Bayer stream, NIR, G and G' are inserted. The demosaicing treats I,G,G' the same as if they were R,G and B and estimates three components per pixel. For example, instead of estimating R,G and B per pixel it estimates NIR, G and G' per pixel. Thus, three full resolution images, NIR, G, and G' are obtained. While the full resolution G can be used, it is really the full resolution NIR that us needed. The G and G' are used by The demosaicing algorithm uses the data in G and G' channels to better estimate NIR value as there exist correlations between different channels.

Several preprocessing options may be considered to produce input for the Demosaic block. The "median of greens" may be chosen, presumably since the green channel is sampled with the highest frequency for RGB-NIR CFA. Among the other preprocessing options, one may consider interpolated red instead of blue, since red has closest spectral range to NIR, and other methods.

II. Decontamination

II.A. Calibration

As stated in EQ. (4), the decontamination model can be simplified. Moreover, the equation can be reformulated as:

$$\begin{bmatrix} R^* \\ G^* \\ B^* \end{bmatrix} = \begin{bmatrix} R \\ G \\ B \end{bmatrix} - \begin{bmatrix} \alpha_r \\ \alpha_g \\ \alpha_b \end{bmatrix} \cdot NIR, \quad (8)$$

where R*, G*, B* are the color channels after decontamination, R, G, B are the input color channels, $\alpha_x$ are the corresponding decontamination factors that need to be found, and NIR is the IR channel.

The task of obtaining the $\alpha$ coefficients is a calibration task. Two approaches for the calibration task are described as follows.

II.A.1. Decontamination Calibration—Color Accuracy Approach

In a color accuracy approach according to an embodiment, one can consider the calibration of the decontamination process as part of the calibration of the full color handling system that already exists in a conventional ISP. For a standard color calibration system, a color calibration chart with known properties is acquired. A calibration chart usually includes uniform color patches where for each patch i, the desired R, G, B values are known and can be marked as $p_i^t = [R_i^t \ G_i^t \ B_i^t]^T$, while the source patch as captured by the sensor is marked as $p_s^i = [R_i^s \ G_i^s \ B_i^s]^T$. The calibration system of a conventional color correction pipeline finds a matrix $C_{3\times3}$ that minimizes $\Sigma|C \cdot p_i^s - p_i^t|$ for all $p_i^s$, $p_i^t$. This task can be solved by linear regression methods. In an embodiment, the patch is a subset of the image, and the optimization is solved for all the patches at once, hence getting the a value that best fits to all patches: $\alpha = \min_\alpha \Sigma |C \cdot p_i^s - p_i^t|$, where the sum is over all patches.

In the case of decontamination, consider the NIR channel I as an additional color channel. Thus, instead of having $C \in \mathbb{R}^{3\times3}$ and $p_i^s \in \mathbb{R}^{3\times1}$, there is now $C \in \mathbb{R}^{3\times4}$ and $p_i^s = [R, G, B, I]^T \in \mathbb{R}^{4\times1}$. The target patches stay the same as before $p_i^s \in \mathbb{R}^{4\times1}$. With this new formulation, minimize the same expression as before $\Sigma|C \cdot p_i^s - p_i^t|$. To extract the decontamination coefficients, represent the matrix C as a multiplication of two matrices $C = M \cdot D$ where $M \in \mathbb{R}^{3\times3}$, and $D \in \mathbb{R}^{4\times3}$. In particular, D can be represented by the equation below:

$$D = \begin{bmatrix} 1 & 0 & 0 & -\alpha_r \\ 1 & 0 & 0 & -\alpha_g \\ 1 & 0 & 0 & -\alpha_b \end{bmatrix}, \quad (9)$$

Once C is found, by solving the above minimization task, since D has a unique structure, finding D is a matter of algebraic manipulations.

II.A.2. Decontamination Calibration—NIR Contamination Approach

For this approach according to an embodiment, a setup is used that includes a color chart/scene with uniform areas, a standard light source (DL65/DL55/incandescent/Warm-White/ . . . ) and an NIR light source. In this situation, the same scene is captured twice: once with the NIR light source off, and the second time with the NIR light source on. It can be assumed that there are some uniform patches/areas in the image, and a relation can be found between the pixel values of these areas when the NIR light source was turned on, and same areas when the NIR light source was turned off.

Suppose there is a patch in which $R_1$, $G_1$, $NIR_1$, values were captured when the NIR light source was turned on, and $R_2$, $G_2$, $NIR_2$ when the NIR light source was turned off, then it can be assumed that the following equation applies.

$$\frac{R_1 - \alpha_R NIR_1}{G_1 - \alpha_G \cdot NIR_1} = \frac{R_2 - \alpha_R NIR_2}{G_2 - \alpha_G NIR_2} \quad (10)$$

By collecting more equations like this from other color channels and other patches, an optimization task can be defined that can find the decontamination coefficients.

This approach is separated from the color calibration task, and the decontamination can be found directly without requiring target colors that are sometimes subjective and defined by the user.

II.B. Saturation and Undershoots Handling for Decontamination

II.B.1. Undershoot Elimination

Undershoot elimination mechanisms classify pixels after decontamination process as undershoots or normal.

An undershoot pixel is defined as a pixel whose value is below some pre-defined threshold while its closest neighbors are above some threshold. The idea is that noise/inaccuracies in the decontamination process might results in pixels that will have very low/zero value. If a pixel is detected as undershoot, its value is replaced by a minimum of the K closest normal neighbors of the same channel.

II.B.2. Saturation Handling

One of the challenges in the decontamination process is saturation handling. That is, for a saturated pixel, since the "real" pixel's value is unknown before saturation, a naïve decontamination will lead to false colors.

For example, consider a case in which the NIR values in a certain portion of the image are already saturated. Now assume a contamination factor of 1 and a saturation value of 255. Therefore, for a certain G pixel in this region, the contaminated value will be G+1*NIR. Since NIR is saturated, the value of the contaminated pixel will also be saturated, i.e. 255. Therefore, subtracting the contamination portion (the NIR value) from the contaminated pixel value will yield 255−255=0, instead of the value of G. This results in a "black hole" effect in the saturated areas.

Embodiments of the disclosure provide a method that mitigates the false colors/black holes artifact that the saturation task produces. A saturation corrector according to an embodiment includes two stages: (1) a classifier for pixels that are suspected to be saturated, and (2) a fallback mechanism that replaces the decontamination candidates that produce the artifact.

II.B.2. a. Saturation Classifier

A saturation classifier according to an embodiment first calculates relevant features from the local neighborhood of the pixel. These pixels are relevant to the decision whether a saturation artifact is suspected to have been output by the decontamination.

Examples for Possible Features

1. The value of a maximal element in an M×N neighborhood.
2. The minimal geometric radial distance (or square geometric radial distance) between the decontaminated pixel and pixels in the M×N neighborhood whose values are larger than some predefined value.

The above features can be translated to a weight by any of the following methods:

1. A binary weight of 0.0/1.0 can be produced from checking if the maximal value is above some predefined threshold T1.
2. A continuous weight for a soft decision mechanism can be produced by normalizing the maximal value to be between 0.0 and 1.0 using two predefined thresholds T2 and T3. Values below T2 are mapped to zero, values above T3 are mapped to 1 and values in between are mapped linearly according to y=(x−T2)/(T3−T2).

3. The minimal geometric radial distance $d_g$ feature can be normalized to a weight according to the below formula:

$$w = \begin{cases} 1, & d_g \leq 1 \\ \dfrac{1}{1+d_g}, & d_g > 1 \end{cases} \quad (11)$$

4. The minimal geometric radial distance $d_g$ can be also normalized to a weight using a method $d_g$ to option 2.

A saturation classifier according to an embodiment selects one or a combination of the above weights to produce the final weight. The weight is used to determine if a pixel is saturated, or more precisely, it determines "how much" a pixel is saturated. Weights can be combined by multiplying them, selecting a maximum value that avoids a saturation artifact, or by selecting a minimal value that avoids a correction where it is not needed.

Finally, a smoothing kernel can be applied to the weights map to yield a smooth result and avoid artifacts related to abrupt spatial changes in the weight map.

A saturation corrector according to an embodiment computes a convex combination of the fallback value and the decontamination value based on the score computed by the detector. A convex combination means a weighted sum in which the weights are summed to 1.

That is, given a computed weight w, a fallback value FB, and an original (decontamination) value of P, a convex combination like P'=wFB+(1−w)P is computed. Indeed, P may sometimes be saturated, but not always, as w is not a binary value that indicates if P is saturated or not, but rather a continuous value between 0 and 1 that indicates the "level of saturation" of P.

II.B.2. b. Fallback Value

According to embodiments of the disclosure, different strategies may be used to determine the fallback value:

Gray value: In this option according to an embodiment, the saturated pixel is transformed to grey.

When the pixels are saturated, the real color is unknown, and followed by decontamination, false colors might occur. To avoid color artifacts, the ratios between the colors can be canceled by forcing them to be equal to the local luminance value (Y), which results in a gray local color. Since white balance (WB) is applied after decontamination, the effect of future white balance gains (WBG) should be taken into account, since the output should be gray after WB has been performed. Hence, an inverse white balance gains (WBG) is applied to the luminance (Y) so that post WB, the output pixel value will be equal to Y, for all color channels. This way the WB gains and the inverse WB-gains are canceling each other.

Using the inverse white balance gains mechanism removes the local color, however the luminance must be preserved. If the luminance of the output is measured after decontamination and WB, some level of luminance, and a distorted color, will be measured. When inverse WB is applied as part of decontamination and WB, a gray color will be obtained but the luminance will not be the same as in the first case. The local luminance can be preserved by applying inverse WB to the Y value computed on the white-balanced pixels. In other words, for the computation of the fallback value, first apply an internal WB before calculating the Y value, and then apply inverse WB on the output Y.

An alternative according to an embodiment to this process is performing decontamination and reconstruction after WB. However, since the saturated pixels should be handled differently, performing RGB-NIR decontamination before WB influences the final result. Applying white balance gains prior to decontamination may saturate the otherwise valid pixel values and clamp the final value to the maximum value. Losing the initial information about the pixel value and the initial color makes it challenging to distinguish between real colors and saturated colors that need to be treated differently.

As part of the saturation treatment, two cases are distinguished: (1) saturated R/G/B pixel and high NIR value; and (2) saturated R/G/B pixel and low NIR value. While removing the contamination portion in the first case will result in a black holes artifact, because the contamination value is the value of the NIR pixel multiplied by a factor, doing so in the second case will not. However, since in both cases R, G or B are saturated, the color should be removed to avoid false colors. Therefore, in both cases, the luminance will be calculated and followed by inverse WB, but in the second case the contamination after WB will be subtracted from the luminance. The final fallback will be a linear combination of the two cases according to the NIR value and 2 thresholds as follows:

(1) Saturated R/G/B Pixel & Low NIR Value $$\text{fallback}_1 = R \cdot g_r + 2G \cdot g_g + B \cdot g_b, \quad (12)$$

where R, G, B are the interpolated color channels that correspond to the center pixel, and the $g_r$, $g_g$, $g_b$ are the corresponding white balance coefficients.

(2) Saturated R/G/B Pixel & High NIR Value $$\text{fallback}_2 = (R - r_{conta})g_r + 2(G - g_{conta})g_g - (B - b_{conta})g_b, \quad (13)$$

where ($g_r$, $g_g$, $g_b$) are the white balance gains, ($r_{conta}$, $g_{conta}$, $b_{conta}$) are the contamination values calculated from the NIR pixel and the decontamination factors. The final fallback will be calculated as a linear combination:

$$\text{fallback} = \text{fallback}_1 \cdot \omega + \text{fallback}_2 (1-\omega), \quad (14)$$

where the weight ($\omega$) is:

$$\omega = \begin{cases} 0 & NIR < thresh_{low} \\ \dfrac{NIR - thresh_{low}}{thresh_{high} - thresh_{low}} & thresh_{low} < NIR < thresh_{high} \\ 1 & NIR < thresh_{high} \end{cases} \quad (15)$$

where $thresh_{low}$, $thresh_{high}$ are the thresholds for the selection between the two suggested fallbacks, and NIR is the NIR value for each R, G, B position.

Local color value: According to an embodiment, another option is to use data from neighboring unsaturated pixels to compute average color. Then the ratios between R, G and B components can be adjusted to reflect this average color value. As in the previous case, the WBG should also be considered.

No decontamination: According to an embodiment, another option is to maintain the original value for the detected pixel, i.e., avoiding decontamination. This can prevent situations like the undershoot case described above.

Inpainting: According to embodiments, there are many existing inpainting approaches that range from classical approaches that try to understand spatial characteristics of neighboring pixels to deep learning methods that exploit semantic information. Such methods may also be useful to predict the value of the saturated pixels. These approaches can be integrated with the saturation classification map described above

III. Bayer Reconstruction

III.A. Avoiding Checkers Artifact

According to an embodiment, to produce RGB output, the RGB-NIR pattern is converted to a Bayer format after decontamination. This allows the reuse of an existing Bayer processing pipeline with the RGB-NIR sensors. To do so, pixels are interpolated to estimate the value of the missing components according to the Bayer pattern.

Figure 13:
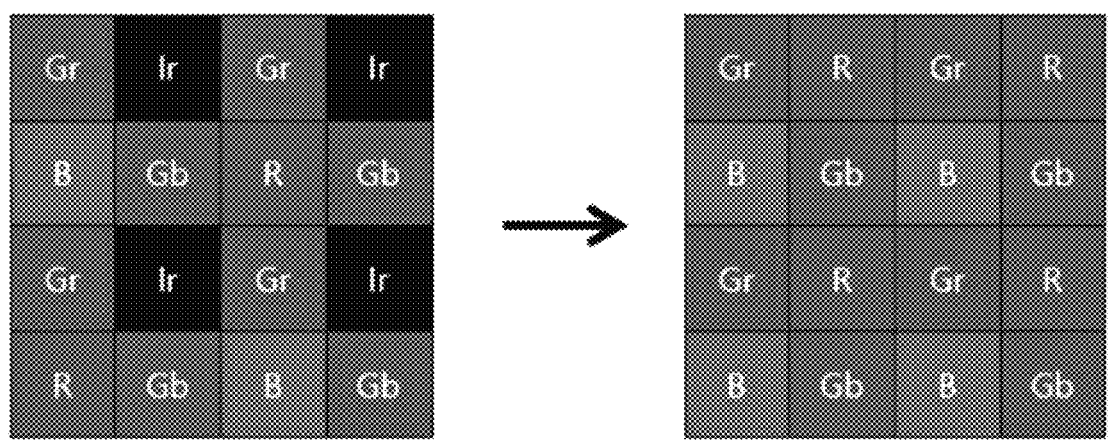
FIG. 13 illustrates Bayer reconstruction, with a Bayer pattern on the left and an RGB-IR 4×4 pattern on the right, according to an embodiment of the disclosure.

For example, referring to FIG. 13, which illustrates Bayer reconstruction, in an RGB-NIR 4×4 case, all of the NIR pixels in odd rows of an RGB-NIR4×4 pattern are replaced with estimated Red values and every other Red pixel in the even rows is replaced with its estimated Blue value. FIG. 13 shows a Bayer pattern on the left and an RGB-IR 4×4 pattern on the right.

If only the Red pixels in the even rows are replaced with the estimated "Blue" values, while the original Blue pixels keep their original value after decontamination, artifacts near edges may result.

Figure 14:
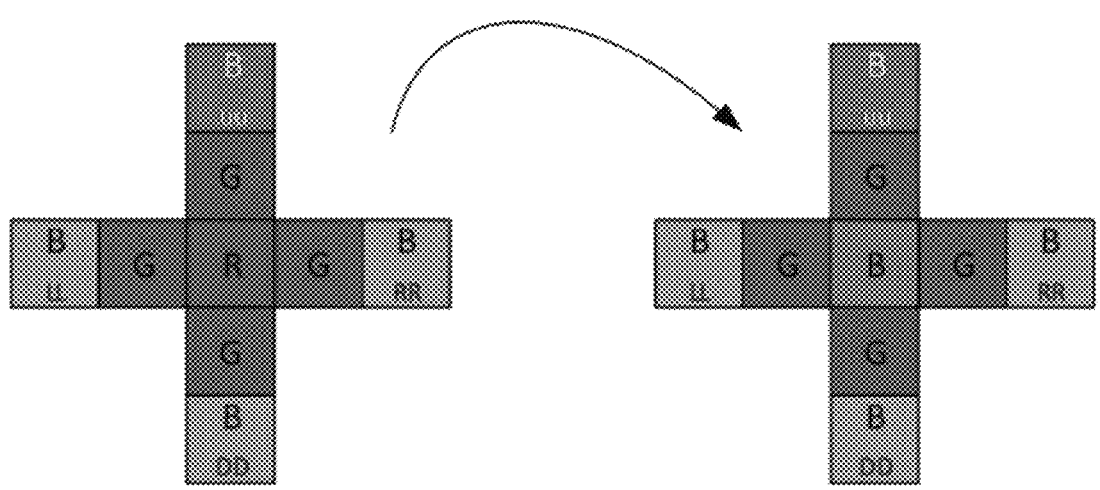
FIG. 14 illustrates a Bayer Reconstruction near an edge, according to an embodiment of the disclosure.

FIG. 14, which illustrates a Bayer reconstruction near an edge, demonstrates such a case. Assume that the Blue value in the Red pixel position, which is the center pixel, is estimated by averaging the 4 neighboring Blue pixels. In this example, due to an edge, the upper Blue pixel, marked as "UU", is darker than the other three. Therefore, the estimated B value in the Blue position will be darker then the bright Blue left/right/bottom pixels. Given that in the resulting Bayer image, in this row every other non-green will be darker. This yields alternating values of Blue pixels, an artifact known as the checkers artifact.

According to an embodiment, to eliminate this artifact, the interpolation can be performed in a more uniform way so that differences of brightness do not occur. In the above example, the pixels values are replaced with estimated values for the Blue pixels, and not only for the Red pixels. In an embodiment, another option is to perform directional interpolation in vicinity of edges.

Figure 15:
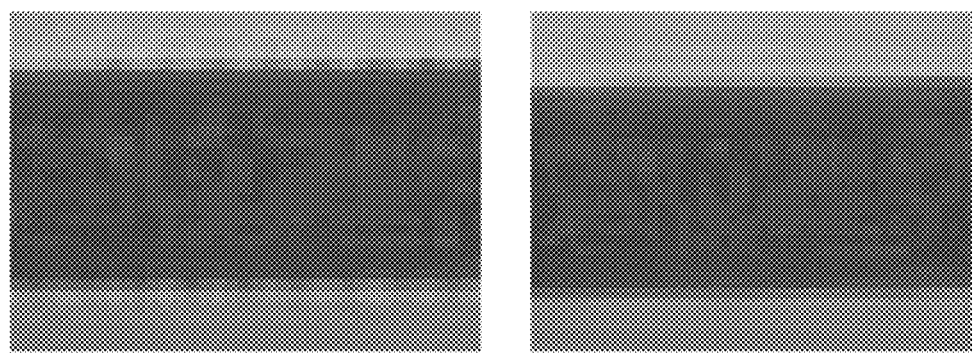
FIG. 15 illustrates checkers elimination, according to an embodiment of the disclosure.

FIG. 15 illustrates the effect of using uniform interpolation to avoid checkers. The image on the left does not have the Checkers correction, while the image on the right does.

III.B. Green Cross-Talk Handling (Green Disparity)

A well-known issue in conventional "Bayer" sensors is the difference between cross-talk effects of green pixels in red rows versus green pixels in blue rows of the sensor. This issue stems from the standard readout mechanisms in conventional sensors that scan every row of pixels and read the pixels in parallel. This electrical structure results in pixels that have cross-talk effects that are stronger between neighboring pixels of the same row.

In a conventional Bayer CFA, the above-mentioned phenomenon creates a disparity between green pixels that are located on red rows and green pixels that are located on blue rows. Taking no action on this disparity effect can cause visible artifacts in the output image that can be intensified by image processing pipelines.

A method according to an embodiment for adaptively correcting a disparity effect is described as follows.

Assume a local area around a central green pixel $G_c$, and denote this local area by $\Omega$. Denote the green pixels that are located on red-rows as $G_i^R \in \Omega$ and green pixels that are located on blue rows as $G_j^B \in \Omega$. Without loss of generality, assume that the central pixel is located on a red row. Then the central pixel can be updated by:

$$G_c^* = G_c + \frac{\left(F(\{G_i^B \in \Omega\}, G_c) - F(\{G_i^R \in \Omega\}, G_C)\right)}{2}, \quad (17)$$

where $F(\{G_i^X\}, G_c)$ is any kind of bilateral average of the green pixels that takes into consideration the distance from the central pixel. In particular, F can be defined as:

$$F(\{G_i^X\}, G_c) = \frac{\sum f(G_i^X, G_C)}{\#(G_i^X \in \Omega)}, \quad (18)$$

where #{X} is defined as the number of elements in a group X, and $f(x,y)$ is any continuous function such that:

$$f(x, y) = \begin{cases} y & x \to \infty \\ x & y - T_1 \leq x \leq y + T_2, \\ y & x \to -\infty \end{cases} \quad (19)$$

The above equation does not define the whole ranges of this function, but defines the general behavior of such function.

Figure 16:
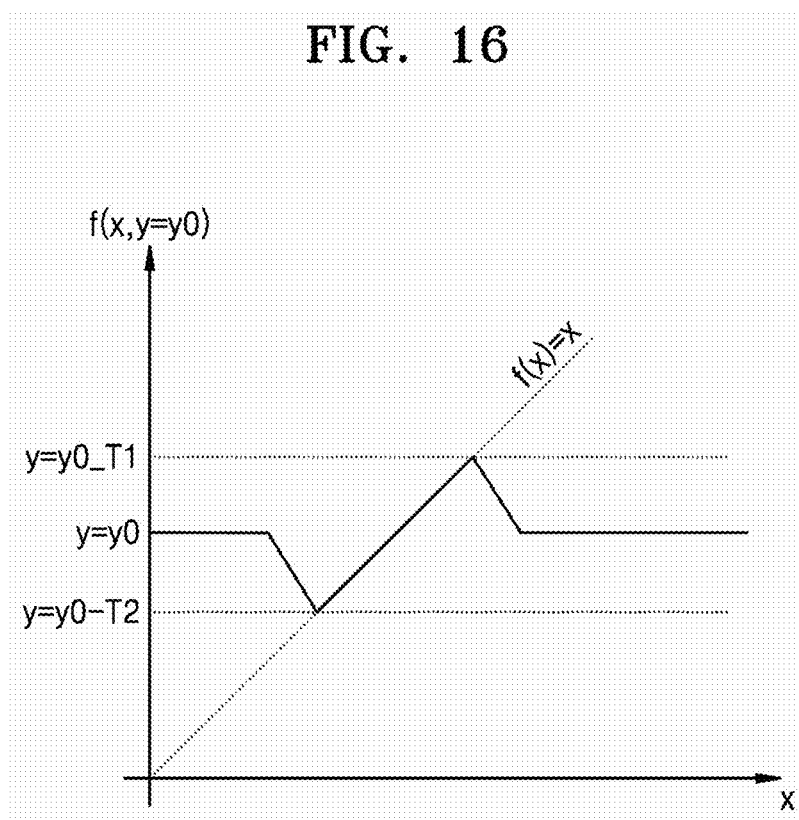
FIG. 16 is a graph of a range limiting function, according to an embodiment of the disclosure.

The graph in FIG. 16 depicts an example of a range limiting function for the case of constant y=y0. The idea behind using this function is that pixels that are too different from the central pixel do not affect the average output. This kind of averaging is efficient for hardware implementations and have properties that are similar to bi-lateral filtering.

Figure 17:
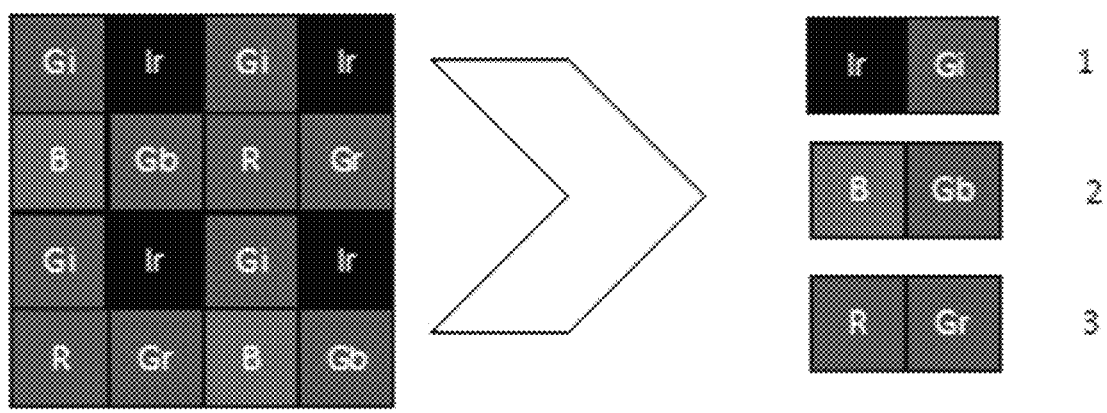
FIG. 17 shows green pixel types in the RGB-IR 4×4 CFA, according to an embodiment of the disclosure.

For the case of RGB-IR sensor, there is a different disparity constellation, illustrated in FIG. 17, which shows green pixel types in the RGB-NIR 4×4 CFA.

In the RGB-NIR 4×4 CFA, consider 3 types of Green pixels:
1. Green pixel which is a right-neighbor of a blue pixel—notated as $G_B$.
2. Green pixel which is a right-neighbor of a red pixel—notated as $G_R$.
3. Green pixel which is a right-neighbor of a NIR pixel—notated as $G_I$.

Here, assuming again without loss of generality that the center pixel is of type $G_R$, then the corrected pixel is:

$$G_c^* = G_c + \left(\frac{F(\{G_i^B \in \Omega\}, G_c) + F(\{G_i^R \in G_c\}) + F(\{G_i^I \in \Omega\}, G_c)}{3} - F(\{G_i^R \in \Omega\}, G_c)\right) \quad (20)$$

A similar expression can be derived for a center pixel of type $G_B$.

IV. Temporal Subtraction

A temporal subtraction method according to an embodiment obtains full resolution NIR images by performing channel-wise subtracting between two RGB-NIR raw images ("current" & "previous"). It is used to extract a full resolution NIR signal by subtracting two images of the same static (or almost static) scene: one captured while an NIR LED is ON, and one while it's OFF. Therefore, by subtracting one frame from another, the contribution of the NIR LED in each pixel location can be obtained.

Given a sequence of RGB-NIR images, the subtraction process sets the ratios between the frames using multipliers $\alpha_j$ and adjusts the overall calculated value per channel using $\beta$. The multiplication by $\alpha_j$ compensates for differences between consecutive frames, such as different exposure times, gains, etc. The multiplication by $\beta$ compensates for the contamination factor obtained by subtracting pixels from consecutive frames, where one has an NIR contribution from an NIR emitter and one lacks such contribution, which yields the NIR value up to the contamination factor. Thus with this multiplication, the values can be normalized:

$$\text{Result} = \beta(Im_A - \alpha_j \cdot Im_B), \tag{16}$$

for images $Im_A$, $Im_B$ and channels j={R, G, B, NIR}. The values are before decontamination. Note that decontamination is not needed in this case as only the NIR signal per pixel is desired. Decontamination is used to output an RGB image.

Figure 18:
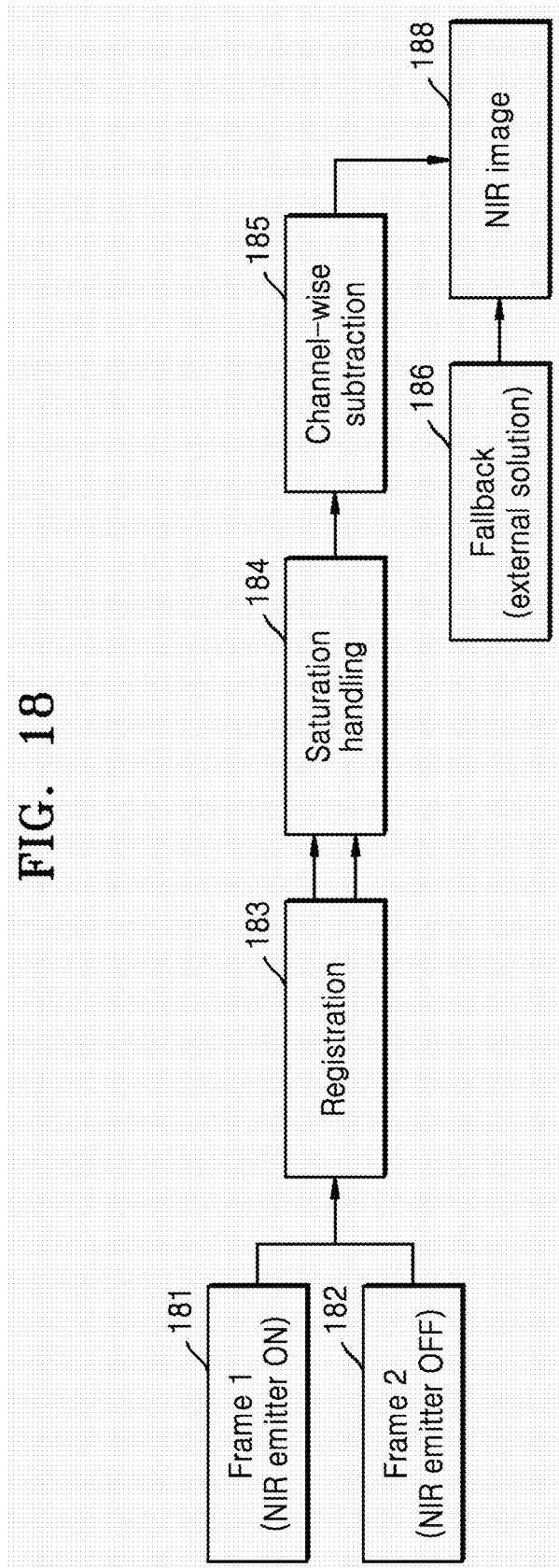
FIG. 18 shows a temporal subtraction system, according to an embodiment of the disclosure.

FIG. 18 shows a temporal subtraction system, according to an embodiment of the disclosure. Referring to the figure, given a first image 181 captured while an NIR LED is ON, and a second image 182 acquired while the NIR LED is OFF, both images are first aligned or registered into one coordinate system at block 183. For this purpose, the 4 channels can be interpolated and used, or the RGB channel that contains the least changes between the NIR-emitter ON/OFF frames can be used. Then, at block 184, saturation handling is performed by detecting and mitigating saturated values. Note that saturation handling is also performed as part of decontamination, described below. Possible mechanisms for saturation handling are described below under "Saturation Handling". The subtraction is performed at step 185. According to an embodiment, the order of subtraction can be reversed, if needed, or the absolute value of a negative subtraction result can be used, instead of zeroing it. It will show only the magnitude of the NIR, without regard for its "direction", for example, which frame has a greater intensity.

Then, at block 188, the subtraction output is fused with the spatial solution 186, which is the decontaminated NIR from the current frame, or subtraction output is taken as a fallback if the registration or the saturation handling fails.

A fusion of the subtraction output and the spatial solution according to an embodiment is based on soft decision. For example, computing some facto $\alpha$ per pixel so that the final result for a certain pixel will be $P_{out} = \alpha P_{spatial} + (1-\alpha) P_{temporal}$, where $P_{spatial}$ is the result of the spatial solution and $P_{temporal}$ is the result of the temporal subtraction solution. Therefore, the question reduces to how to compute $\alpha$.

In general a should be correlated with the confidence of each of the two solutions. For example, if one of the solutions is saturated or computed from saturated values, more weight will be given the other one. For example, the temporal solution is the difference between two consecutives frames: $P_{temporal} = P_{prev} - P_{curr}$. It may be that one of $P_{prev}$ or $P_{curr}$ both are saturated. In that case the value of $P_{temporal}$ is not reliable. If in this case $P_{spatial}$ is not based on saturated pixels values it makes sense to give more weight to the spatial solution.

In addition the confidence of $P_{temporal}$ is related also to the registration between the previous and the current frames. Some motion compensation algorithms can output a confidence map. If such an algorithm is used for the registration, $\alpha$ can be correlated with it. Furthermore, if both $P_{temporal}$ and $P_{spatial}$ are not based on saturated values and the two solutions differ considerably, it can be assumed that the difference may be due to motion issues and/or illumination changes issues, such as illumination change between the consecutives frames, etc. In that case greater weight will be given to $P_{spatial}$.

Note that the entire system, or one of its components, can be implemented with machine learning methods, such as neural networks.

V. NIR Edge Directed Interpolation

V.A. Introduction

This section describes a Hamilton-Adams (HA) inspired interpolation in the case of RGB-NIR input data type. This approach follows the work of Niu, et al. [2], that extended the work of Adams, et al. [3]. The HA algorithm assumes a Bayer input, however, an NIR edge-directed interpolation algorithm according to an embodiment assumes RGB-NIR input of pattern size 4×4.

To do so, a method according to an embodiment uses a same strategy but different tactics. For example, both HA and an NIR edge-directed interpolation according to an embodiment compare the horizontal and vertical variation and select the smoother direction to perform interpolation, but differ in the way each perform the interpolations.

Strategy steps of a method according to an embodiment include:
Compute the variation in two perpendicular directions.
Perform interpolation for each direction.
Compute weights for each direction and calculate final value by convex combination.

V.B. NIR Edge-Directed Green Channel Interpolation

V.B.1. Compute the Horizontal/Vertical Variation of Green Channel

Figure 19:
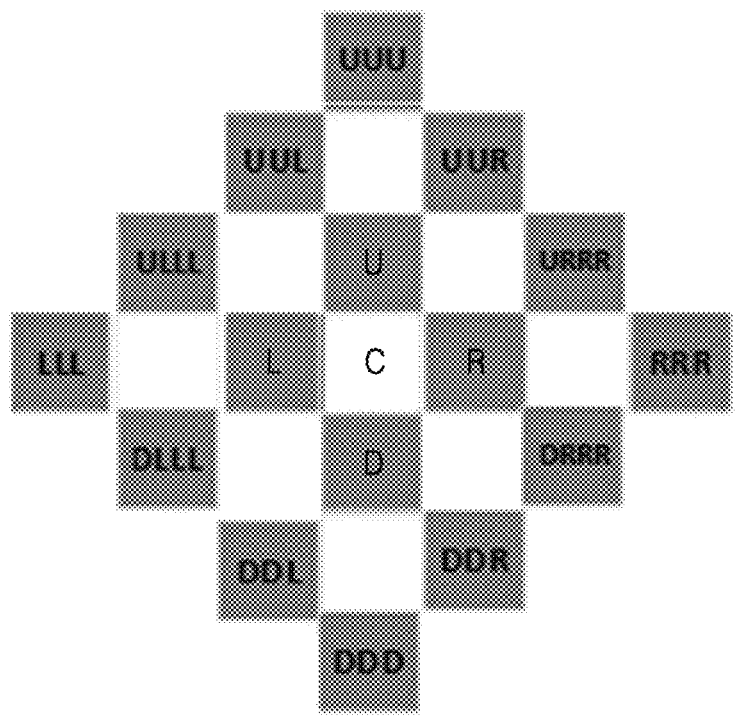
FIG. 19 illustrates HA green pixels for interpolation, according to an embodiment of the disclosure.

FIG. 19 illustrates green pixels for interpolation, according to an embodiment of the disclosure. To compute the variation, first compute the derivative, hence calculate all possible derivatives in a 5×5 environment, as shown in FIG. 19. An exemplary list of derivatives is as follows. Only the horizontal derivatives are listed, since the vertical derivatives can be computed similarly.

$\partial_h^2((RRR-R)/2-(L-LLL)/2)/4$ $\partial_h=(R-L)/2$ $\partial_h^{left}=(L-LLL)/2$ $\partial_h^{right}=(RRR-R)/2$ $\partial_h^{left\_down}=(D-DLLL)/2$ $\partial_h^{right\_down}=(DRRR-D)/2$ $\partial_h^{left\_up}=(U-ULLL)/2$ $\partial_h^{right\_up}=(URRR-U)/2$ Finally, the horizontal variation is the maximum absolute value of the derivatives or a weighted combination of the absolute values of those derivatives.

For example:

$$v_h = 4|\partial_h| + |\partial_h^{right\_down}| + |\partial_h^{right\_up}| + |\partial_h^{left\_down}| + |\partial_h^{left\_up}|. \quad (21)$$

The vertical variation $v_v$ is calculated similarly.

V.B.2. Perform Interpolation for Each Direction

According to an embodiment, for each perpendicular direction, a directional interpolation is performed. For example, possible horizontal interpolation can be computed as:

$$h_{value} = (L+R)/2;$$

$$h_{value} = (3L+3R-RRR-LLL)/4;$$

$$h_{value} = (9L+9R-RRR-LLL)/16.$$

A vertical interpolation $v_{value}$ can be computed similarly.

V.B3. Compute Weights

According to an embodiment, the weights are computed for each direction and a final value is calculated by convex combination. The weights are calculated as follows:

$$w_h = \frac{1}{1 + e^{k(v_h - v_v)}}, \; w_v = 1 - w_h, \quad (22)$$

The final interpolation result is computed as $w_h \cdot h_{value} + w_v \cdot v_{value}$.

V.C. NIR Edge-Directed Channel Interpolation in Blue/Red Position

Figure 20:
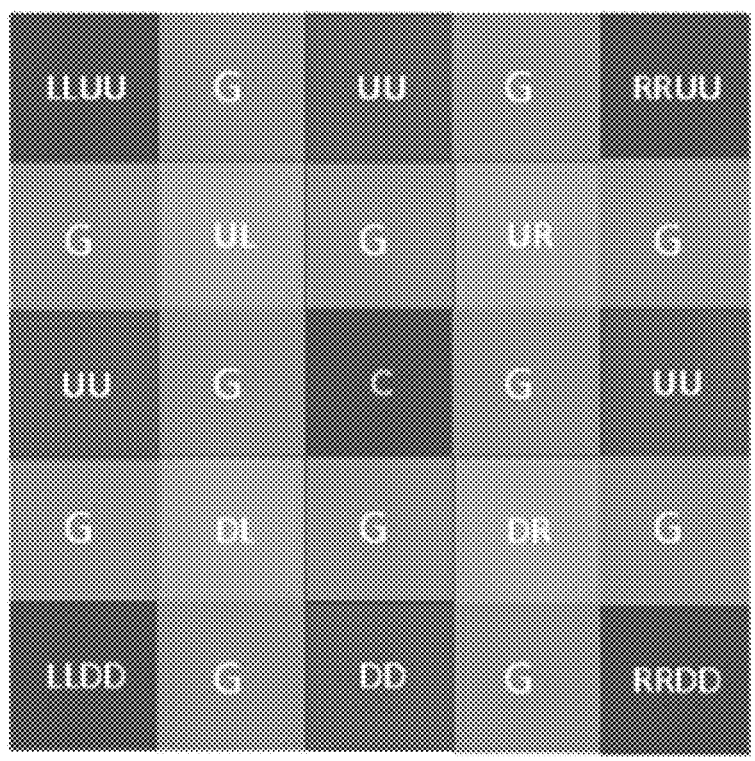
FIG. 20 illustrates a 4×4 HA interpolation of NIR on red/blue positions, according to an embodiment of the disclosure.

FIG. 20 illustrates a 4×4 edge-directed interpolation of NIR on red/blue positions, according to an embodiment of the disclosure. To do so, a method according to an embodiment uses the diagonals (Slash/back-slash) directions, similar to horizontal/vertical directions in the green interpolation stage.

V.C.1. Compute the Diagonals Variations

To compute the variation, first compute the derivative, hence calculate all possible derivatives in a 5×5 environment. An exemplary list of derivatives is as follows. Only the derivatives for the slash are listed, since the back-slash derivatives can be computed similarly.

$\partial_s^2 = (LLUU+DDRR-2C)/8$ — This is second derivative of pixels the same color as center.

$\partial_s = (UL-DR)/2$ — This is derivative of the NIR pixels.

$\partial_{sg} = (UL_{green} - DR_{green})/2$ — This is derivative of the Green pixels in the NIR locations. These green values are computed in section V.B. NIR Edge-Directed Green Channel Interpolation, above.

Notice that mathematically one should divide by $\sqrt{2}$ but this is not necessary since only the proportions between the variations are used.

Finally, the slash-diagonal variation is computed as the maximum absolute value of the derivatives or a weighted combination of the absolute values of those derivatives.

For Example:

$$v_s = k_1|\partial_s| + k_2|\partial_s^2| + k_3|\partial_{sg}|. \quad (23)$$

The back-slash-diagonal variation $v_b$ is calculated similarly.

V.C.2. Perform Interpolation for Each Direction

According to an embodiment, a directional interpolation is performed for each direction. For example, possible slash interpolations can be computed as:

$$s_{value} = (UL+DR)/2;$$

$$s_{value} = (5UL+5DR-DDDRRR-UUULLL)/8.$$

Back-Slash interpolation values $b_{value}$ can be computed similarly.

V.C.3 Compute Weights

According to an embodiment, weights are computed for each direction and a final value is calculated by convex combination. The weights are calculated as follows:

$$w_s = \frac{1}{1 + e^{k(v_s - v_b)}}, \; w_b = 1 - w_s. \quad (24)$$

The final interpolation result is computed as $w_s \cdot s_{value} + w_b \cdot b_{value}$.

V.D. NIR Edge-Directed Channel Interpolation in Green Position

According to an embodiment, once the estimation of the NIR values for red/blue positions from the previous stage is ready, the NIR values can be interpolated for the green pixels positions. To do so, a very similar approach to the one used above for interpolating the green channel in the first stage using horizontal and vertical directions.

First the derivative $v_{h_{Nlr}}$ is computed as a maximum value or a weighted combination of the absolute values of the derivatives of the NIR channel. This is done in the same way as described above for Green derivatives, as expressed in EQ. 21.

Then the final horizontal variation is computed as:

$$v_h = v_{h_{Nlr}} + v_{h_g}$$

where $v_{h_g}$ is the horizontal derivative of the green channel, computed in EQ. 21.

A vertical variation $v_v$ can be computed similarly.

Finally, directional interpolation is performed in the same way as described above for the green channel interpolation case.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

FIG. 21 is a block diagram of a system for implementing an image processing pipeline to RGB-NIR sensors that will results in two images, visible and NIR, according to an embodiment of the disclosure. Referring now to FIG. 21, a computer system 211 for implementing the present disclosure can comprise, inter alia, a central processing unit (CPU) or controller 212, a memory 213 and an input/output (I/O) interface 214. The computer system 211 is generally coupled through the I/O interface 214 to a display 215 and various input devices 216 such as a mouse and a keyboard. The support circuits can include circuits such as cache, power supplies, clock circuits, and a communication bus. The memory 213 can include random access memory (RAM), read only memory (ROM), disk drive, tape drive, etc., or a combinations thereof. The present disclosure can be implemented as a routine 217 that is stored in memory 213 and executed by the CPU or controller 212 to process the signal from the signal source 218. As such, the computer system 211 is a general purpose computer system that becomes a specific purpose computer system when executing the routine 217 of the present disclosure. Alternatively, as described above, embodiments of the present disclosure can be implemented as an ASIC or FPGA 217 that is in signal communication with the CPU or controller 212 to process the signal from the signal source 218.

The computer system 211 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

REFERENCES

[1] Tang, et al., "High Resolution Photography with an RGB-Infrared Camera", IEEE International Conference on Computational Photography (ICCP), 2015, pp. 1-10.
[2] Niu, et al., "Low Cost Edge Sensing for High Quality Demosaicking", TIP 2019.
[3] Adams, et al., "Adaptive Color Plane Interpolation in Single Sensor Color Electronic Camera", U.S. Pat. No. 5,629,734 (1997).

What is claimed is:

1. A method for processing images acquired by a multi-spectral RGB-NIR (red/green/blue/near infra-red) sensor, comprising:
receiving an RGB-NIR digital image from a multi-spectral RGB-NIR sensor, wherein the RGB-NIR digital image includes red (R) pixels, green (G) pixels, blue (B) pixels, and NIR pixels, wherein every other row in the RGB-NIR digital image includes NIR pixels that alternate with green pixels, and every other row in the RGB-NIR digital image includes green pixels that alternate with red and blue pixels;
interpolating an NIR contribution to each R, G and B pixel value, wherein an NIR image is obtained;
subtracting the NIR contribution from each R, G and B pixel value in the RGB-NIR digital image wherein a decontaminated RGB-NIR image is obtained;
constructing a red, green and blue (RGB) Bayer image from the decontaminated RGB-NIR image; and
processing the Bayer image wherein a full color image is obtained,
wherein interpolating an NIR contribution to each R, G and B pixel value comprises:
replacing R and B pixels in the RGB-NIR digital image with a G' pixel whose value is a median of values of nearest neighbor G pixels to the R or B pixel being replaced, wherein an NIR-GGG' image is obtained that includes NIR pixels, G pixels, and G' pixels; and
demosaicing the NIR-GGG' image wherein a 3-channel image is obtained, where the 3-channel image includes a G channel image, a G' channel image, and an NIR channel image
wherein subtracting the NIR contribution from each R, G and B pixel value in the RGB-NIR digital image comprises:
determining the NIR contributions $\alpha_R$, $\alpha_G$, $\alpha_B$ are for each of R, G and B pixel values;
detecting undershoot pixels in the RGB-NIR digital image, and replacing a value of each detected undershoot pixel with a value that is a minimum of K nearest neighbor pixels of a same channel as the detected undershoot pixel; and
classifying pixels in the RGB-NIR digital image whose values are saturated by calculating a score of features of nearest neighbor pixels to the pixel being classified, wherein the features are relevant to a determination of whether the pixel being classified is saturated, and
replacing the value of a pixel determined to be saturated with a convex combination of a fallback value and the pixel's decontamination value based on the calculated score.

2. The method of claim 1, wherein determining the NIR contributions $\alpha_R$, $\alpha_G$, $\alpha_B$ are for each of R, G and B pixel values comprises:
finding a 3×4 matrix C that minimizes $\Sigma_i |C \cdot p_i^s - p_i^t|$, wherein i is one of R, G, B, or NIR, $p_i^s$ is a 4×1 vector of R, G, B, and NIR samples acquired by the multi-spectral RGB-NIR sensor, $p_i^t$ is a 3×1 vector of desired R, G, B values, C is of form C=M·D, wherein M is a 3×3 matrix, and D is a 3×4 matrix of form $$D = \begin{bmatrix} 1 & 0 & 0 & -\alpha_R \\ 1 & 0 & 0 & -\alpha_G \\ 1 & 0 & 0 & -\alpha_B \end{bmatrix},$$

wherein $-\alpha_R$, $-\alpha_G$, $-\alpha_B$ are the NIR contributions for each of R, G and B pixel values respectively.

3. The method of claim 1, further comprising calculating a fallback value from a following equation:

$$\text{fallback} = \text{fallback}_1 \cdot \omega + \text{fallback}_2 \cdot (1-w),$$

wherein $\text{fallback}_1 = R \cdot g_r + 2G \cdot g_g + B \cdot g_b$, wherein R, G, B are color values of nearest neighbors to the pixel being classified, and $g_r$, $g_g$, $g_p$ are corresponding white balance coefficients, wherein $\text{fallback}_2 = (R - r_{conta}) \, g_r + 2 \, (G - g_{conta}) \, g_g + (B - b_{conta}) g_b$, wherein $g_r$, $g_g$, $g_b$ are the white balance coefficients of nearest neighbors to the pixel being classified, and $r_{conta}$, $g_{conta}$, $b_{conta}$ are contamination values calculated from an NIR pixel and the NIR contributions for each of R, G and B pixel values, and $$\omega = \begin{cases} 0 & NIR < thresh_{low} \\ \dfrac{NIR - thresh_{low}}{thresh_{high} - thresh_{low}} & thresh_{low} < NIR < thresh_{high}, \\ 1 & NIR < thresh_{high} \end{cases}$$

wherein $thresh_{low}$ is a threshold for a low NIR value and $thresh_{high}$ is a threshold for a high NIR value.

4. The method of claim 1, wherein constructing a red, green and blue (RGB) Bayer image from the decontaminated RGB-NIR image comprises:

in rows that contain NIR pixels, replacing NIR pixels with estimated R values, and in rows that do not contain NIR pixels, replacing each R pixel with an estimated B value, and replacing each original B value with a value based on the estimated B value; and correcting each green pixel value in a row that includes red pixels according to $$G_c^* = G_c + \left( \frac{(F(\{G_i^B \in \Omega\}, G_c) + F(\{G_i^R \in \Omega\}, G_c) + F(\{G_i^I \in \Omega\}, G_c))}{3} - F(\{G_i^R \in \Omega\}, G_c) \right),$$

and correcting each green pixel value in a row that includes blue pixels according to $$G_c^* = G_c + \left( \frac{(F(\{G_i^B \in \Omega\}, G_c) + F(\{G_i^R \in \Omega\}, G_c) + F(\{G_i^I \in \Omega\}, G_c))}{3} - F(\{G_i^B \in \Omega\}, G_c) \right),$$

wherein $G_c$ is a green pixel value being corrected, $G_c^*$ is a corrected green pixel value, $\Omega$ is a predetermined neighborhood of nearest pixels to $G_c$, $G_i^R \in \Omega$ are green pixels located in red-rows, $G_j^B \in \Omega$ are green pixels located on blue rows, and $G_j^I \in \Omega$ fare green pixels located on NIR rows, $$F(\{G_i^x\}, G_c) = \frac{\sum f(G_i^X, G_C)}{\#\{G_i^x \in \Omega\}},$$

where $\#(G_i^x \in \Omega)$ is a number of pixels in $G_i^x \in \Omega$ wherein x is B, R or I, and $f(x,y)$ is any continuous function such that:

$$f(x, y) = \begin{cases} y & x \to \infty \\ x & y - T_1 \leq x \leq y + T_2, \\ y & x \to -\infty \end{cases}$$

wherein $T_1$ and $T_2$ are predefined thresholds.

5. The method of claim 1, wherein processing the Bayer image includes one or more of noise reduction, demosaicing, sharpening, color correction, tone mapping or gamma correction.

* * * * *